US009442201B2

(12) United States Patent
Schmand et al.

(10) Patent No.: US 9,442,201 B2
(45) Date of Patent: Sep. 13, 2016

(54) CMOS SPAD ARRAY WITH MIXED TIMING PICK-OFF FOR TIME-OF-FLIGHT POSITRON EMISSION TOMOGRAPHY

(71) Applicant: Siemens Medical Solutions USA, Inc., Malvern, PA (US)

(72) Inventors: Matthias J. Schmand, Lenoir City, TN (US); Nan Zhang, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/468,384

(22) Filed: Aug. 26, 2014

(65) Prior Publication Data

US 2015/0069250 A1 Mar. 12, 2015

Related U.S. Application Data

(60) Provisional application No. 61/876,841, filed on Sep. 12, 2013.

(51) Int. Cl.
| | | |
|---|---|---|
| *G01T 1/29* | (2006.01) | |
| *G01T 1/24* | (2006.01) | |
| *G01T 1/20* | (2006.01) | |
| *G01T 1/208* | (2006.01) | |

(52) U.S. Cl.
CPC .............. *G01T 1/249* (2013.01); *G01T 1/208* (2013.01); *G01T 1/2018* (2013.01); *G01T 1/248* (2013.01)

(58) Field of Classification Search
CPC ..... A61B 6/037; G01T 1/2985; G01T 1/248; G01T 1/247
See application file for complete search history.

(56) References Cited

U.S. PATENT DOCUMENTS

| | | | |
|---|---|---|---|
| 4,963,727 A | 10/1990 | Cova | |
| 5,933,042 A | 8/1999 | Trottier et al. | |
| 6,384,663 B2 | 5/2002 | Cova et al. | |
| 6,541,752 B2 | 4/2003 | Zappa et al. | |
| 7,547,872 B2* | 6/2009 | Niclass et al. | ............ 250/214 R |
| 8,395,127 B1* | 3/2013 | Frach et al. | ............ 250/370.11 |
| 2008/0156993 A1* | 7/2008 | Weinberg et al. | ....... 250/363.03 |
| 2009/0224158 A1* | 9/2009 | Haselman et al. | ....... 250/363.02 |
| 2011/0278466 A1 | 11/2011 | Frach et al. | |
| 2013/0087710 A1* | 4/2013 | Zhang et al. | ................. 250/362 |
| 2014/0048711 A1* | 2/2014 | Henseler et al. | ............ 250/362 |

OTHER PUBLICATIONS

R. H. Haitz, "Mechanisms Contributing to the Noise Pulse Rate of Avalanche Diodes," Journal of Applied Physics, vol. 36, No. 10, pp. 3123-3131, Oct. 1965.

S. Cova, et al., "Avalanche photodiodes and quenching circuits for single-photon detection," Applied Optics, vol. 35, No. 12, pp. 1956-1976, Apr. 1996.

D. Renker, et al., "Advances in solid state photon detectors," Journal of Instrumentation, vol. 4, No. 4, pp. 1-56, Apr. 2009.

(Continued)

*Primary Examiner* — Marcus Taningco

(57) ABSTRACT

Timing pick-off is provided in time-of-flight positron emission using digital output photo sensors (e.g., SPAD or dSiPM). The timing-to-digital converter (TDC) is replaced for timing detection with a mixed analog and digital timing pick-off (MTP) where a processor determines the timing from an output of the MTP. The digital SPAD or dSiPM output is summed into an analog waveform, allowing for triggering based on signal statistics or other than at a particular number of discrete detections. The trigger is used by the processor to extrapolate the time of occurrence without an integrated TDC.

14 Claims, 3 Drawing Sheets

(56) References Cited

OTHER PUBLICATIONS

M. Metzger, "Multi-Pixel Photon Counter MPPC," Hamamatsu Photonics, pp. 1-24, Jan. 2007.

P. S. Marrocchesi, et al., "Active control of the gain of a 3mm×3mm Silicon PhotoMultiplier," Nuclear Instruments and Methods in Physics Research A602, pp. 391-395, 2009.

Y. Haemisch, et al., Fully Digital Arrays of Silicon Photomultipliers (dSiPM)—A Scalable Alternative to Vacuum Photomultiplier Tubes (PMT), Physics Procedia 37, pp. 1546-1560, 2012.

D. R. Schaart, et al., "Initial Evaluation of Digital Silicon Photomultipliers for Time-of-Flight PET," IEEE Nuclear Science Symposium and Medical Imaging Conference, Valencia, Spain, pp. 1-2, 2011.

F. Corsi, et al., "Modelling a silicon photomultiplier (SiPM) as a signal source for optimum front-end design," Nuclear Instruments and Methods in Physics Research A 572, pp. 416-418, 2007.

T. Frach, et al., "The Digital Silicon Photomultiplier—Principle of Operation and Intrinsic Detector Performance," 2009 IEEE Nuclear Science Symposium Conference Record, pp. 1959-1965, 2009.

\* cited by examiner

CMOS SPAD ARRAY WITH MIXED TIMING PICK-OFF FOR TIME-OF-FLIGHT POSITRON EMISSION TOMOGRAPHY

RELATED APPLICATIONS

The present patent document claims the benefit of the filing date under 35 U.S.C. §119(e) of Provisional U.S. Patent Application Ser. No. 61/876,841, filed Sep. 12, 2013, which is hereby incorporated by reference.

BACKGROUND

The present embodiments relate to timing measurement in positron emission tomography (PET). Blocks of detectors detect gamma rays emitted indirectly by a positron-emitting tracer. Single photon avalanche diodes (SPADs) or silicon photomultipliers (SiPMs) are solid state photo sensor devices capable of detecting a single photon. Conventionally, a SPAD or SiPM device is built from an avalanche photo-diode (APD) array of microcells on a common silicon substrate. Every APD operates in the Geiger discharge mode, so intrinsically an SPAD or SiPM microcell is a digital device with "0" (switch off) or "1" (switch on) states. SPAD or SiPM may be categorized as analog mode devices, (aSiPM) or digital mode devices, (SPAD, dSiPM).

Using spatially diverse detectors, pairs of gamma rays generated by a same positron may be detected. The pairs of gamma rays travel about 180 degrees apart. To distinguish specific pairs, the coincidence of detected gamma rays is determined. The timing of receipt is used to pair the detected gamma rays. In time-of-flight PET, the timing of receipt indicates a range of locations along the line of response at which the emission occurred. Time-of-flight is used to detect segments of the line of response for more rapid and/or greater resolution reconstruction.

The timing of a detected event is determined using a timing pickoff circuit to determine a time at which the event occurred. Different types of timing circuits have been proposed. The type of timing circuit may depend on the detector. For analog timing, the microcells of the aSiPM device are connected in parallel. Each microcell includes an APD photo sensor and a passive-quenching resistor. The summed anodes and cathodes interface to front-end readout circuits, most of which are outside the aSiPM devices. The circuits may include high gain preamplifiers for the timing channel. Usually, an analog-timing-pickoff (ATP) method is used to obtain the timing-trigger from the comparator-based constant-fraction-discriminator (CFD) or leading-edge discriminator (LED) circuit. After the CFD or LED, the analog pulse is transformed to a "0" to "1" edge-trigger. This trigger is subsequently converted to digital information by a timing-to-digital-converter (TDC) for further processing.

Instead of passively summing all the APD microcells in the aSiPM, SPAD based digital SiPM (dSiPM) uses field-effect transistors (FET), including pMOS and nMOS, to process each microcell digitally—directly obtain the "0" to "1" timing trigger and reset the avalanching microcell by an automatic active quenching circuits. In contrast to an analog SiPM (aSiPM) device, both the APD photo sensors and the logic circuits are integrated in the standard CMOS process. However, conventional SPAD devices for single photon detection have one TDC per microcell. The TDC is a complex device that uses a substantial amount of area in a chip, resulting in less photon detection area. In dSiPM timing detection, the digital triggers from the firing microcells are connected to a trigger network. The trigger network selects a time based on the number of microcells that have fired, and connects this trigger to a TDC. Hence, the SPAD or dSiPM is then restricted to triggering when one microcell (SPAD) or a certain number of microcells (dSiPM) have been fired and not based on the scintillation photon statistics which is an intrinsic physics property in PET timing measurements.

BRIEF SUMMARY

By way of introduction, the preferred embodiments described below include methods, systems, instructions, and computer readable storage media for timing pick-off in time-of-flight positron emission tomography. For digital SPAD or dSiPM, the TDC is replaced for timing detection with a mixed analog and digital timing pick-off (MTP) where a processor determines the timing from an output of the MTP. The digital SPAD or dSiPM output is summed into an analog waveform in voltage or current, allowing for triggering based on signal statistics or other than at a single photoelectron (PE) detection or a particular number of discrete detections. The trigger is used by the processor to extrapolate the time of occurrence without an integrated TDC. The time-mark (TM) could be obtained through a conventional TDC technique but may instead be extrapolated (but not limited to extrapolation processing) from the leading-edge of the trigger pulse with MTP.

In a first aspect, a system is provided for timing pick-off in time-of-flight positron emission tomography. An array of single photon avalanche diodes is formed as complementary metal-oxide semiconductors. A summer connects with the single photon avalanche diodes of the array and analog sums pulses from the single photon avalanche diodes into a waveform of photon scintillation signal over time. A trigger circuit connects with the summer and is configured to generate a trigger signal as a function of the waveform. A timing circuit connects with the trigger circuit and is configured to determine a start time of the trigger signal. The summer, trigger circuit, and timing circuit are free of a time-to-digital converter.

In a second aspect, a method provides for timing pick-off in time-of-flight positron emission tomography. An analog event signal is created as an integration of photon detections from digital silicon photomultipliers in a timing pickoff channel. A trigger pulse is generated from the analog event signal. A time for a positron emission is identified from a leading edge of the trigger pulse.

In a third aspect, a positron emission tomography (PET) system is provided. Single photon avalanche diodes are operable to detect positron emission. A mixed analog and digital timing pick-off is configured to determine a trigger from a continuous sum of digital pulses output by the single photon avalanche diodes. A processor is configured to determine a time of the positron emission from digital samples of the trigger.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
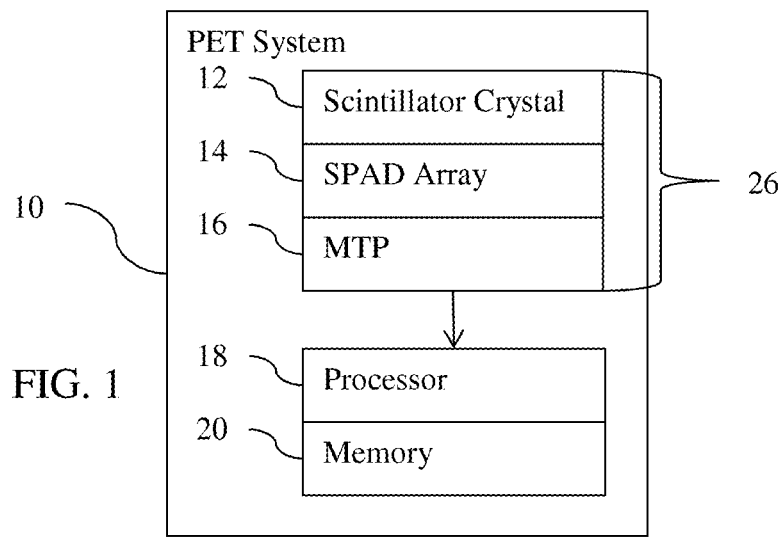
FIG. 1 is a block diagram of one embodiment of a PET system with timing pick-off in time-of-flight PET.

Maybe counterintuitively, but the more complex SPAD or dSiPM timing pickoff structure based on "one-to-one" coupling (one TDC per microcell or one TDC per "scintillator pixel") actually will degrade PET timing measurement precision. This is due to the fact that scintillation detection is statistical in nature. Enough photons (or photoelectrons, PEs) are acquired and accumulated (summed) in order to reduce the statistical errors. From statistics, the jitter (variant) may be calculated as $$\sigma_N = \frac{\sigma_1}{\sqrt{N}},$$

where $\sigma_1$ is a jitter for any given single PE, $\sigma_N$ is the jitter with "N" PEs. So from the photon statistical point-of-view, enough "N" are acquired in order to improve timing measure accuracy in PET applications. In contrast to trigger from single microcell in SPAD or a SPAD array in dSiPM, MTP obtains timing trigger from one detector block which includes multiple SiPM devices in the 3×3 or 4×4 arrays, for example. This configuration enables a larger "N" being used for PET timing pickoff.

A complementary metal-oxide semiconductor (CMOS) SPAD or dSiPM array with an MTP structure is provided for PET in time-of-flight applications. The MTP structure may be embedded in a SPAD integrated circuit or an integrated circuit connected with the SPAD to optimize SPAD photon detection efficiency (PDE). The combination of the digitally operating SPAD or dSiPM with the mixed mode timing pick-off may allow for more refined or more statistically desirable timing determination for statistical based photon detection, such as PET application.

A photo sensor device is provided in the mixed (analog and digital) mode as compared to fully analog mode (e.g., photomultiplier tube (PMT), APD, aSiPM or as compared to purely in the digital mode (e.g., SPAD or dSiPM). The advantages of the mixed approach are to overcome the limitation of increased timing variation of the purely digital mode providing better (lower) photoelectron statistical errors (jitter), and better (lower) noise-to-slope ratio.

When using scintillation detection to capture photons from an incident gamma-event, the timing resolution is not about "which" photo-electron (PE) is the fastest, but about where or when the pulse has the least error in the time domain (timing jitter). The first PE may not deliver the best timing even though the first PE is the fastest in the thousands of PEs from a single scintillation event. The best timing may not originate from the first PE trigger nor from the first digital trigger from the first avalanching SPAD microcell. From a photon statistic point-of-view, timing jitter of a single PE is larger than many PEs arriving at time (t). Generally speaking $$\sigma_N = \frac{\sigma_1}{\sqrt{N}},$$

where $\sigma$ is the jitter (standard deviation), 1 is a single PE, and N is the total number of PEs. There is no specific PE that may be characterized as the one to deliver the best timing. Statistically, each digital trigger may not be statistically significant. Statistical calculation with many more photons delivers a lower timing jitter mathematically.

For the SPAD array, the timing trigger from each microcell is in discrete format in the time-domain. A group of PEs are needed in order to have enough statistics to obtain the lowest timing jitter. Furthermore, the timing mark with the lowest timing jitter may fall in-between the discrete timing-trigger-points from the SPAD microcells. It may be difficult to record each PE incident to obtain the exact time-mark.

The MTP structure with a CMOS SPAD array is to improve SPAD timing-pickoff in PET applications. In a SPAD timing pickoff channel, the digital timing-trigger from each microcell is used to form a partial analog pulse. The pulse is not for recovering the full pulse in the complete scintillation duration, but just to obtain the first N PEs (e.g., N<10 for Lutetium oxyorthosillicate LSO scintillators) in the pulse initial leading-edge and then to locate the event timing trigger by using an analog comparator. In the timing channel, the SPAD digital trigger outputs per microcell-array are added in voltage or current to form a continuous analog pulse. Only the initial partial leading edge is needed for the timing pickoff. A comparator compares this leading edge to a statistically significant threshold to obtain the event trigger timing. Generally, the trigger point has the highest noise-to-slope ratio (NSR). One comparator per array of microcells is sufficient in one embodiment.

In various embodiments, an integrated circuit structure may be provided for a SPAD array in standard CMOS process for use in PET TOF applications. The TDC electronics per microcell in the conventional SPAD or per device in dSiPM is not used. Without TDC, the SPAD photon detection efficiency (PDE) may be increased by an increase in the SPAD microcell geometry factor($\epsilon_{geom}$) or amount of area for which microcells are formed rather than other electronics. The SPAD device power consumption may be reduced, hence reducing device self-heating and improving device thermal properties.

This MTP structure for use with the SPAD or dSiPM allows for reducing the TDC to one per SPAD device, or complete removal of the TDC function from the SPAD device. The TDC requires a large layout area for a SPAD device. Compared with conventional SPAD for single photon detection, the device geometry factor and photon detection area are at a premium. One TDC per microcell in the traditional SPAD uses too much silicon real estate. Depending on the size of the microcell, one trigger output per SPAD array is sufficient in PET application. For example, for a SPAD device in the active area of 6 mm×6 mm, one trigger per device is well adequate in PET. In addition, one detector block may use several SPAD, such as in a 2×2 or 3×3 array, for a sufficiently large scintillation block in order to reduce edge-crystal scatter artifact. Multiple (4 or 9) triggers from each device may to be processed by a trigger select circuit to pick just one timing trigger. Then the MTP function should be implemented outside the SPAD devices; one MTD for each detector block. Since TDCs consume the most of the power in the traditional SPAD, removing the TDCs from the SPAD device also eases device power consumption and thermal management issues.

The MTP-based timing pickoff method may improve the conventional SPAD design for PET in time-of-flight (TOF) applications. The SPAD structures may have the timing-pickoff in the analog domain for linear timing rather than in the digital domain for discrete timing. Since the timing jitter is originated from the photon statistical uncertainty of a scintillator and not dominated by the SPAD structure or the readout electronics, conventional SPAD may be improved for dedicated PET applications. The timing pick-off from an analog or linear timing may more accurately locate the timing trigger by fully complying with PET scintillation detection statistical theories (e.g., timing may be between discrete triggers of the microcells).

Another benefit of the mixed photo sensors is, that it may be formed in standard CMOS process, allowing integration of additional mixed analog and digital circuits. Active-quenching circuitry may be provided since the microcell trigger output is digital rather analog.

For the energy channel, any SPAD energy approach may be used. For example, SPAD photon counting indicates the energy information. One counter per SPAD device may be sufficient.

FIG. 1 shows one embodiment of a positron emission tomography (PET) system 10. The PET system 10, using hardware, software, or hardware and software, determines the time of occurrence of events as part of functional imaging. The timing information is used for time-of-flight processing.

Figure 2:
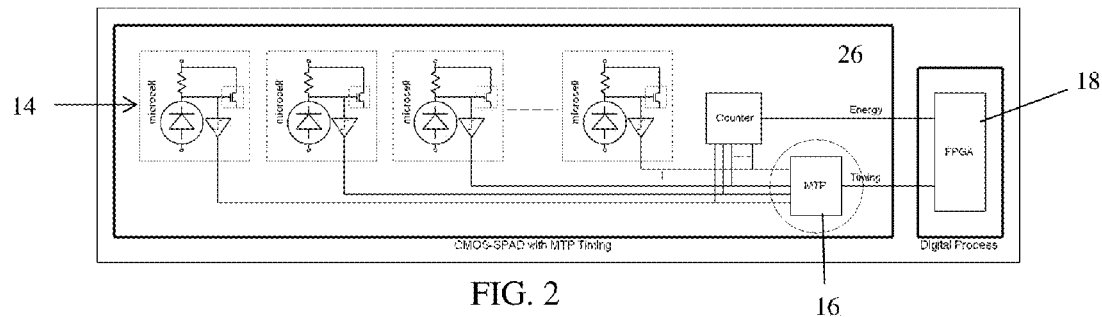
FIG. 2 illustrates one embodiment of a combination SPAD and MTP for timing pick-off.

The PET system 10 includes a processor 18, a detector 26, and a memory 20. Additional, different, or fewer components may be provided. For example, FIG. 2 represents a portion of the PET system 10. Additional detectors 26 may connect with the processor 18. The same processor 18 determines event times for different detectors. Alternatively or additionally, different processors 18 with or without shared memory 20, determine event times for other detectors. In another example, a light guide is provided between the scintillator crystal 12 and the SPAD array 14.

The processor 18 is part of the detector block or is remote from the detectors, such as being between the detector block and a workstation for reconstruction. The processor 18 or another processor may perform coincidence processing and/or reconstruction or be dedicated to determining time-of-flight and energy. In alternative embodiments, the processor 18 and memory 20 are provided as a workstation or computer without connecting with the detector 26. Detector signals are transmitted to or loaded from memory 20 for determining the timing.

A bed, housing, and/or other components of the PET system 10 are not shown, but any now known or later developed components of the PET system 10 may be used. The detector 26 and processor 18 are a timing pick-off system for use in time-of-flight positron emission tomography. The processor 18 determines the time-of-flight from information from the detector 26 with or without intervening components. In this arrangement, the processor 18 acts on digital information to determine the time-of-flight. The time-of-flight is determined without a TDC. There is no TDC for each microcell, and there is no TDC before the processor as the processor uses digital information to find the time. There is no TDC in the MTP 16, so the summer 30, trigger circuit 32, and timing circuit (e.g., processor 18) are free of a time-to-digital converter. Without a TDC, the SPAD active area and the photon detection efficiency may be increased, as compared to conventional SPAD devices. Simplifying SPAD readout electronics and removing the TDC function out of the SPAD device increases area available for photo sensors where the timing circuits are integrated.

The detector 26 detects positron emissions. The positron is emitted from a tracer or radiopharmaceutical. The positron interacts with an electron near the location of emission, generating gamma rays propagating at about 180 degrees apart. One of the gamma rays is received by or travels to the detector 26. Another gamma ray travels to another detector.

The detector 26 is separate from other detectors. The detector 26 may abut or connect with other detectors in a block or ring. Multiple blocks of detectors may form a ring or part of a ring around a patient space or bore of the PET system 10. By at least partially surrounding the bore, different events may be detected by different detectors. A given detector (e.g., detector 26) may detect a sequence of events from the same or different locations of the patient.

The detector 26 includes a scintillation crystal 12, SPAD array 14, and MTP 16. Additional, different, or fewer components may be provided. The SPAD array 14 and the MTP 16 are shown as separate devices, but may be formed in a same silicon wafer or chip.

The scintillation crystal 12 is a layer of crystalline material for generating light from an incident electron. Any now known or later developed scintillator crystal 12 may be used. The scintillation crystal 12 converts the gamma or other radiation into light.

The SPAD array 14 is positioned against the scintillator crystal 12, such as being bonded together. The SPAD array 14 detects the light from the scintillator crystal 12. The coupling or channeling of the scintillation light into the SPAD array 14 is not limited to the aforementioned pathway. There are multiple solutions to do this, such as direct coupling, non-structured light guide, structured light guide, or light fibers are just an excerpt of possible additional couplings.

The SPAD array 14 is an array of single photon avalanche diodes. In one embodiment, the SPAD array 14 is a digital silicon photomultiplier. The array is formed of microcells, each including an avalanche photodiode operating in the Geiger mode to detect photons. Additional circuitry may be provided in a microcell, such as one or more transistors for active and/or self-quenching. An amplifier, comparator, or circuits (e.g., microcell trigger logic) for triggering a digital output, such as transitioning from a zero value to a positive value, may be included. The microcells of the SPAD array 14 output binary indications of detection of a photon. Any persistence after the quenching may be provided, such as 10-200 nanoseconds.

The SPAD array 12 is formed as a complementary metal-oxide semiconductor (CMOS). The microcells are created in a silicon wafer or chip using CMOS processes. In other embodiments, other semiconductor manufacturing processes are used. Other substrates than silicon may be used.

The MTP 16 is formed using CMOS in the same chip or wafer. The SPAD array 12 and the MTP 16 are formed together. Alternatively and to maximize the photon detection area of the SPAD microcells-, the MTP 16 is formed using CMOS or other process on a separate chip or wafer, which is then wafer bonded to the chip of the SPAD array 14. The SPAD array 14 chip separates the MTP 16 chip from the scintillator crystal 12. Other arrangements between the MTP 16 and SPAD array 14, such as side by side, wire bond, flexible circuit connections, or spaced apart, may be used.

The MTP 16 includes a summer and a trigger circuit for mixed analog and digital operation. The components of the MTP 16 are arranged to generate a digital trigger signal that can be used by the processor 18 to determine the time at which an emission event occurred. The SPAD array 14 outputs digital information from the microcells. Rather than using an entirely digital process, the MTP 16 generates the digital trigger signal using, in part, analog processing. The digital outputs from the SPAD array 14 are summed as an analog waveform, creating a continuous signal from the outputs of the single photon avalanche diodes. The digital 0, 1 pulses are summed to form an analog waveform, providing a change from digital to analog. The trigger pulse or signal is obtained from the analog waveform. This analog pulse is then converted to 0 to 1 trigger through a comparator. The processor 18 determines the digital timing mark from the trigger leading edge (e.g., 0 to 1 transition) of the output of the MTP 16.

FIG. 2 shows the detector 26 with the processor 18 included. Any number of microcells is formed into the SPAD array 14. The microcell outputs are provided to the counter for energy calculation and to the MTP 16 for timing pick-off. The microcells include a FET for active quenching providing short recovery time as compared with passive quenching in aSiPM and the ability to tune-off noisy cells, and include digital trigger logic circuits. Not every cell has to have a trigger (e.g. FET). Cells may be clustered in groups sharing a same trigger. The energy portion (channel) counts how many photon-electron (PE) events occur during a given detection. The timing portion (channel) is originated from the quanta's wave property using analog processing while the energy is obtained based on quanta's particle property using PE counting. The MTP 16 uses analog and digital processes for PET timing pick-off.

Figure 3:
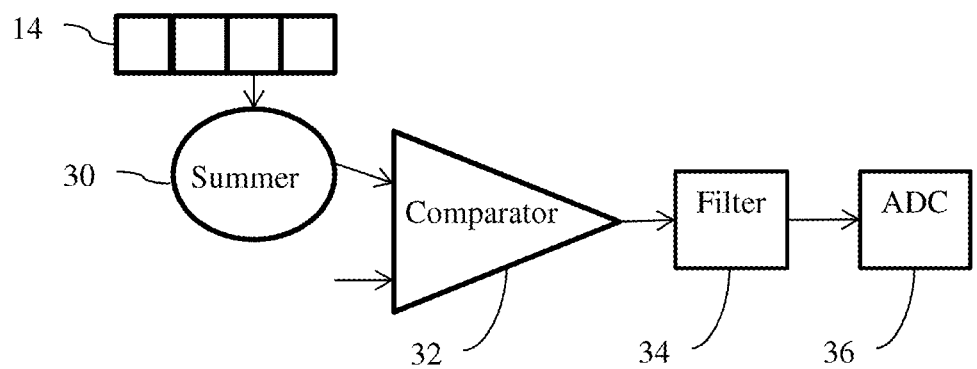
FIG. 3 is block diagram of one embodiment of a mixed analog and digital timing pick-off (MTP) circuit.

FIG. 3 shows one embodiment where the MTP 16 includes the summer 30, a trigger circuit (comparator 32), a filter 34, and an analog-to-digital converter 36. Additional, different, or fewer components may be provided. For example, a comparator may be used for each microcell, and the outputs of the comparators are summed by the summer 30. Any circuit arrangement for allowing triggering from analog information using digital inputs from the SPAD array 14 and providing a digital output to the processor 18 to determine a timing of the trigger may be used.

The summer 30 is a transistor network (e.g., CMOS current or voltage summing circuit) or other circuit to sum digital inputs into an analog output. In one embodiment, the summer 30 is a digital-to-analog converter using each bit as a 1 value rather than as a collection representing a particular number. The summer 30 generates a continuous or analog sum of the digital pulses output by the microcells of the array 14. For example, if 2 microcells output pulses or fire, then the summer 30 outputs a constant sum of 2. As another microcell fires, the sum moves to 3, and so on. Rather than outputting a digital sum, a continuous waveform with an amplitude representing a sum of the digital inputs is output. The waveform represents the sum of photons received in response to the positron emission signal over time.

Figure 4:
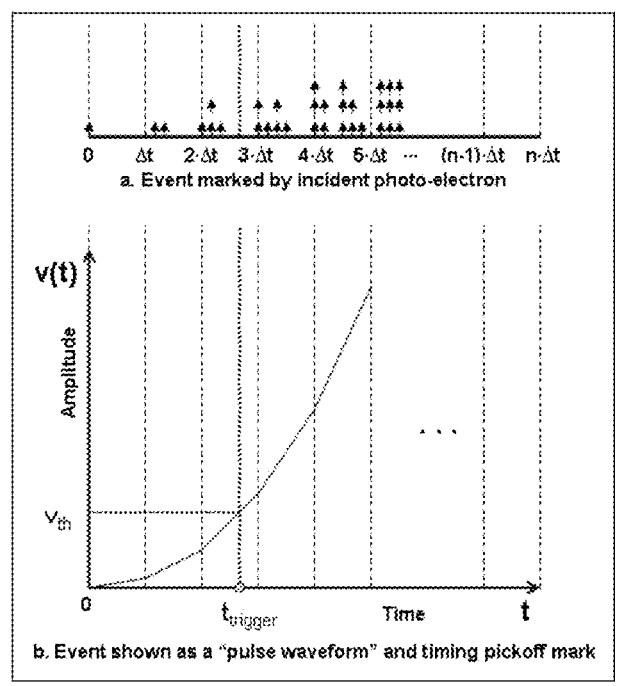
FIG. 4 is an example chart and graph comparing analog and digital triggering, respectively.

The summer 30 operates as a voltage or current summer. For example, the amplitude of the voltage represents the analog sum. As additional pulses or firings occur, the voltage amplitude rises. The lower graph in FIG. 4 shows analog summing continuously converting the digital or binary outputs from each microcell to reconstruct an analog waveform. FIG. 4 represents incident photoelectrons, $pe^1$, $pe^2$, $pe^3$ ... $pe^n$, each happening at time $t_1$, $t_2$, $t_3$ ... $t_n$. Note that the incident events are not distribution evenly in the time domain. That is to say:

$$(t_2-t_1) \neq (t_3-t_2) \tag{1}$$

The first PE is occurs at time $t_1$. In the time domain, time incremental intervals are marked as:

$$(t_1+0\cdot\Delta t),(t_1+1\cdot\Delta t),(t_1+2\cdot\Delta t),(t_1+3\cdot\Delta t) \ldots (t_1+n\cdot\Delta t) \tag{2}$$

To simplify the analysis, $t_1=0$. The incremental time intervals are:

$$(0\cdot\Delta t),(1\cdot\Delta t),(2\cdot\Delta t),(3\cdot\Delta t) \ldots (n\cdot\Delta t) \tag{3}$$

For any given $(j\cdot\Delta t)$, there are $pe^j$, $pe^{j+1}$, $pe^{j+2}$ ... $pe^{j+(m-1)}$ PEs. The total PE amount m and incident time $(j\cdot\Delta t)$ are determined from the scintillation process, which is statistically based.

The top chart of FIG. 4 represents an entirely digital approach to detection. Given the statistical nature of the data, the event is detected not at the first PE, but at some point in time after the first PE. In the top chart of FIG. 4, an incident scintillation event is shown in the discrete (particle property) format. The bottom graph of FIG. 4 shows an analog waveform format as a continuous sum of the PEs. Only a partial waveform in the pulse leading edge is shown as the timing pick-off is triggered from this initial leading edge. From an electronics data-acquisition point-of-view, the discrete (particle property) information in top chart of FIG. 4 behaves as the waveform (wave property) format shown in the graph of the bottom of FIG. 4. The event in time $(j\cdot\Delta t)$ may be observed or measured as:

$$i(j\cdot\Delta t)=i_{pe^j}+i_{pe^{j+1}}+i_{pe^{j+2}}+ \ldots +i_{pe^{j+(m-1)}} \tag{4}$$

So the PE events $pe^1$, $pe^2$, $pe^3$ ... $pe^n$, which happen at times $t_1$, $t_2$, $t_3$ ... $t_n$, are transformed to an i(t) pulse shape. Since:

$$v(t)=i(t)\cdot z(t) \tag{5}$$

where z the impedance of the preamplifier. The voltage waveform v(t) rather than current signal i(t) is processed for timing pickoff, but the current signal may be used instead. The lower graph of FIG. 4 shows the continuous or analog v(t) function.

FIG. 4 represents digital and analog approaches to timing pick-off. For a digital approach to timing-pick-off (DTP), the timing pickoff is based on the particle property of the quanta (i.e., number of PEs). As shown in the top chart of FIG. 4, photon scintillation is in a discrete format. The incident PEs each have a same amplitude (energy of one PE in this case) but occur at different times $t_1$, $t_2$, $t_3$ ... $t_n$. For the MTP and analog timing pick-off, timing is determined by the quanta wave property. As shown in bottom graph of FIG. 4, the photon scintillation is in the pulse waveform format.

For illustration purpose, the pulse v(t) has the best-timing (e.g., lowest timing jitter) at voltage-level ($V_{th}$) and time ($t_{trigger}$). This best-timing, as indicated in the top chart of FIG. 4, occurs in-between $(2\cdot\Delta t)$ and $(3\cdot\Delta t)$. This ($t_{trigger}$) is between PE #7 and PE #8. But neither PE #7 or PE #8 gives the best timing. For a DTP, choosing timing from the incident PEs may introduce an intrinsic error due to the photon's statistical property. Assigning a digital pick-off at the 1st PE, 2nd PE, or even at something like 1.5 PE and then picking a particular ($t_{trigger}$) does not solve the above issue, because the trigger at the digital events in the Y-axis does not directly translate to a timing mark in X-axis. More complex calculations to deal with this may require more complex circuitry and/or more processing in 18. These complex digital-signal-processing circuits may not be feasible to be placed in the SPAD devices for a needed real time process.

Figure 5:
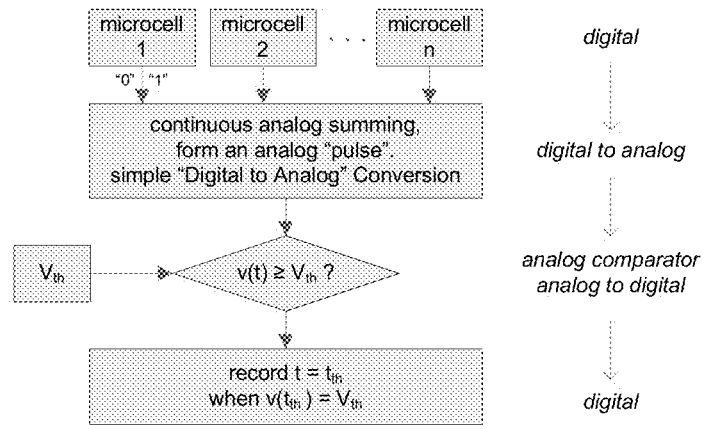
FIG. 5 is a flow chart diagram of one embodiment of a method for timing pick-off in time-of-flight positron emission tomography.

Instead of using digital, analog timing-pick off is used despite the digital output of the SPAD array 14. The summer 30 creates the waveform by summing all the time dispersed digital trigger outputs coming directly from the SPAD array 14 of the bottom graph of FIG. 4 for timing pick-off in an analog domain. FIG. 5 shows this microcell to continuous or analog summing transition from digital to analog. In order to optimize or simplify the MTP processing in 18, a filter may be implemented between the SPAD array 14 and summer 30 or the filter might be part of the summer 30.

The trigger circuit 32 is a comparator, but may be another device or collection of devices for causing a pulse at a given input signal level. As an example, a comparator with a pico second reaction range and a bandwidth of 8 GHz or more is used. The trigger circuit 32 connects with the output of the summer 30 to generate a trigger signal as a function of the analog sum (e.g., v(t)). For example, the trigger circuit 32 as a comparator compares an amplitude of the continuous sum to a threshold and generates a trigger when the waveform rises to become equal to or greater than the threshold.

The threshold is any reference amplitude input. The trigger reference is represented as $V_{th}$ in FIGS. 4 and 5. The value of $V_{th}$ is determined by the characteristics of the scintillation crystal, block detector structure, SPAD photo sensor properties, the front-end readout electronics, and/or other detector 26 characteristics. In theory, the trigger threshold is determined by the pulse lowest noise-to-slope ratio (NSR). The value may be determined experimentally to find the best timing (e.g., lowest jitter) considering the statistical properties of the photon. The threshold level is programmed, set by the circuit, or may use an external circuit such as a programmable digital-to-analog converter (DAC). For example, calibration may be used to adjust the threshold with an input external to the MTP 16 or chip with the MTP 16.

The trigger circuit 32 generates a pulse. The pulse may be considered digital, as the pulse is a binary change of state. The time of occurrence of the pulse is to be determined. In one embodiment, the output is voltage limited so that the trigger pulse is used by the processor 18 as a digital input. In other embodiment, since the pulse output by the comparator is analog and has a corresponding transition time, further processing may be provided to allow the processor 18 to determine the time from the pulse leading-edge.

To avoid using fast sampling analog-to-digital converters, the filter 34 converts the trigger circuit 32 output into a ramp signal, stretching the signal over time. The filter 34 is a low pass filter (LPF), such as a resistor (R), inductor (L), and capacitor (C) based passive LPF. The filter 34 is an analog filter. The filter 34 connects with the output of the comparator to filter the trigger signal. In alternative embodiments, a filter 34 is not provided.

The analog-to-digital converter (ADC) 36 converts the ramp signal or trigger into a digital form and generate the time-mark (TM). The analog ramp signal is sampled at a given rate by the ADC 36. The digitized ramp signal is passed to the processor 18. The ADC 36 does not provide the timing, but instead provides a digital representation of the ramp signal. Alternatively, the ADC 36 receives and outputs a digital sampling of the trigger output or summed amplitude over time (e.g., v(t)). The time relative to the ramp signal is known. Given the ADC processing that occurs, the time at which the trigger initially occurred may not exactly match with the time at which the ramp signal is initially sampled.

The timing circuit is the processor 18. Rather than a dedicated or discrete timing circuit (e.g., TDC), a programmable or programmed processor 18 may determine the time. The processor 18 connects with the trigger circuit 32 to determine a start time of the trigger signal. The processor 18 is configured by hardware and/or software to determine a time of the positron emission from digital samples of the trigger.

The processor 18 is a general processor, central processing unit, control processor, graphics processor, digital signal processor, application specific integrated circuit, field programmable gate array (FPGA), digital circuit, analog circuit, timing circuit, combinations thereof, or other now known or later developed device for detecting event timing. For example, the processor 18 is a field programmable gate array (see FIG. 2) for determining a time corresponding to when the analog sum waveform reached the threshold. In one embodiment, the processor 18 is part of an arithmetic and logic unit (ALU). The processor 18 is a single device or multiple devices operating in serial, parallel, or separately. The processor 18 is specifically designed or provided for timing measurement, but may be a main or general processor of a computer, such as a laptop or desktop computer, or may be a processor for handling tasks in a larger system, such as the PET system 10. The processor 18 may perform other functions than timing measurement, such as coincidence processing, energy calculation, and/or line of response determination.

The processor 18 is configurable. The processor 18 is configured by software and/or hardware. For example, different software, firmware, and/or instructions are loaded or stored in memory 20 for configuring the processor 18.

The processor 18 is configured to determine the start time as a time at which the ramp signal has zero amplitude, or at a certain predefined threshold (e.g., at the 50% of the peak). The digitized ramp signal may or may not include a zero amplitude signal. Using interpolation or extrapolation, the time at which the ramp signal began is determined by the processor 18. For example, a field programmable gate array (FPGA) is configured by logic to determine the start time as a zero amplitude point of the trigger signal. This last zero amplitude portion prior to rising of the digitized analog ramp signal (i.e., trigger signal from the triggering circuit 32) represents the time at which the amplitude of the sum reached the threshold with the best statistical confidence (jitter) based not on a single first, second, third, or fourth, or other integer arrival but on a PE assemble.

The processor 18 or another processor may process the energy count as well. Even though the analog summing is a continuous (or free running) process, from timing pickoff point-of-view, what matters is the partial-pulse at the leading-edge. The threshold is likely associated with 10 or fewer PEs for LSO scintillation crystal based detectors. As a result, the timing trigger ($t_{th}$) from the timing channel is obtained much earlier than total energy (E) because the total energy (E) is obtained from the accumulation of all the PEs (e.g., thousands) in an incident event. An earlier ($t_{th}$) allows the processor 18 a longer time to perform timing calculations. The extra time may be utilized inside or outside the SPAD device, MTP 16, or processor 18 in order to reduce the any dead time for processing between event detections. For example, the processor 18 has time to determine the zero crossing, acting as a TDC function, while the energy count continues.

The processor 18 outputs the detected times for the events. The times are output by transmission, such as transmission to a coincidence processor and/or reconstruction processor. Alternatively or additionally, the times are output by storage in the memory 20 or another memory. The time is output with the energy and line of response information for PET reconstruction.

The memory 20 is a random access memory, graphics processing memory, video random access memory, system memory, cache memory, hard drive, optical media, magnetic media, flash drive, buffer, database, combinations thereof, or other now known or later developed memory device for storing data. The memory 20 stores PET input data, such as digital samples of the signal output from the detector 26 and/or timing information detected from the samples. The memory 20 stores data as processed, such as storing detected times of events or other data. The times for output may be stored or provided directly for processing without storage. Alternatively, a separate or different memory is used for PET input data and/or output times.

The memory 20 or other memory is a non-transitory computer readable storage medium storing data representing instructions executable by the programmed processor 18 for positron emission tomography (PET) timing determination. The instructions for implementing the processes, methods and/or techniques discussed herein for the processor 18 are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over communication optical fiber lines. In yet other embodiments, the instructions are stored within a given computer, CPU, GPU, or system.

Figure 6:
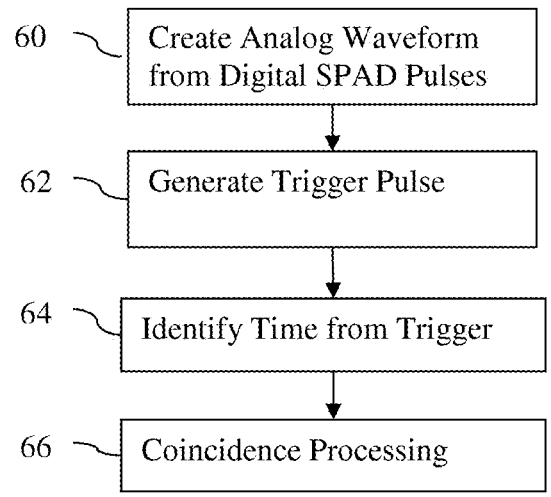
FIG. 6 is a flow chart diagram of another embodiment of a method for timing pick-off in time-of-flight positron emission tomography.

FIG. 6 shows one embodiment of a method for timing pick-off in time-of-flight positron emission tomography. The time of an event is determined for use in time-of-flight PET reconstruction. The time for an event from one detector may be matched with a time of an event for another detector to define a line of response. The time may be used in time-of-flight to identify a segment along the line of response. For the time-of-flight or coincidence processing, the time of each event at the detectors is determined with nano or several hundred pico second accuracy.

The method of FIG. 6 is implemented using the system of FIG. 1, the MTP 16 of FIG. 3, the arrangement of FIG. 2, or other device. In one embodiment, the creating act 60 and generating act 62 are performed by circuits integrated in a CMOS adjacent to digital silicon photomultipliers in a different CMOS. In other embodiments, the creating act 60 and generating act 62 are performed by circuits integrated in a same CMOS as the dSiPM or SPAD. An MTP circuit performs acts 60 and 62, and a separate processor performs act 64.

The method is performed in the order shown, but other orders may be used. For example, act 62 is performed prior to act 60. Additional, different, or fewer acts may be provided. For example, acts for line of response segment determination from time-of-flight and/or PET reconstruction are provided.

A PET event is detected. In response to an emission of a pair of gamma rays, arrays of crystals contacted by the gamma rays generate light. The detectors, in response to the light, generate signals. For a given emission, two signals are detected. Each signal is an event at a different detector. Within each detector, a sequence or chain of firings occur in response to the photon and are used to detect the event.

SPAD or dSiPM microcells (e.g., avalanche diodes) generate digital or binary pulses in response to the photon. A plurality of firings occurs over time. In act 60, an analog event signal is generated from the digital firings. The analog event is generated as an integration of positron emission detections from the microcells. The binary pulses from the array of single photon avalanche diodes are summed into the analog event signal. The analog event signal has a rising voltage over time (see FIG. 4). The analog event signal is continuous over at least a time during which a trigger is generated in act 62.

In act 62, a trigger pulse is generated. The trigger pulse is generated from the analog event signal. The analog event signal is compared to a threshold. When the event signal or sum exceeds the threshold or equals the threshold, the trigger pulse is generated.

Further processing may be performed prior to act 64. For example, the trigger pulse is treated as an analog signal and filtered with an analog filter. By filtering the rising edge of the trigger pulse, the filter creates and outputs a ramp signal. The ramp signal has an increasing voltage over time.

The ramp signal is converted to digital. The ramp signal is digitized. Any sampling period may be used. Other signals may be alternatively digitized for timing determination in act 64.

In act 64, the time for the positron emission is identified. A processor uses the leading edge of the trigger pulse, such as the digitized ramp signal, to identify the time. For example, the samples are used to fit a line or curve. The time at which the curve or line is at or crosses the zero voltage level represents the time of triggering. That is the time of the emission detection. Interpolation or extrapolation may be used instead of line fitting.

In act 66, the time is used for time-of-flight PET. The time is reported for coincidence processing. The time information is stored or transmitted for use in coincidence processing and/or time-of-flight PET. During reconstruction, the time-of-flights determined by the times for a same event at two different detectors are used to locate a segment or part of the line of response from which the emission occurred. This segment information is used in reconstructing the distribution of emissions.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system for timing pick-off in time-of-flight positron emission tomography, the system comprising:
   an array of single photon avalanche diodes formed as complementary metal-oxide semiconductors;
   a summer connected with the single photon avalanche diodes of the array, the summer for analog summing pulses from the single photon avalanche diodes into a waveform of positron emission signal over time;
   a trigger circuit connected with the summer, the trigger circuit configured to generate a trigger signal based on a scintillation photon statistic of the waveform; and
   a timing circuit connected with the trigger circuit, the timing circuit configured to determine a start time of the trigger signal;
   wherein the photon statistic is a trigger threshold determined by a pulse lowest noise-to-slope ratio (NSR); and
   wherein the summer, trigger circuit, and timing circuit are free of a time-to-digital converter.

2. The system of claim 1 wherein the single photon avalanche diodes comprise digital silicon photomultipliers.

3. The system of claim 1 wherein the array comprises a first chip, and wherein the summer and trigger circuit are formed in a second chip wafer bonded to the first chip, the first chip separating the second chip from a scintillation crystal.

4. The system of claim 1 wherein the summer comprises a continuous analog summer.

5. The system of claim 1 wherein the analog summer sums the pulses into the waveform of voltage where the waveform rises in amplitude as additional pulses occur.

6. The system of claim 1 wherein the trigger circuit comprises a comparator with a reference amplitude input and an input of the waveform, the comparator generating the trigger signal as a state transition when the waveform rises to cross a reference threshold.

7. The system of claim 1 further comprising a plurality of comparators, each of the comparators connected with a respective one of the single photon avalanche diodes, and wherein the summer connects with outputs of the comparators.

8. The system of claim 1 wherein the trigger circuit comprises:
   an analog filter configured to generate a ramp signal as a function of the waveform; and
   an analog-to-digital converter configured to convert the ramp signal into digital samples.

9. The system of claim 8 wherein the timing circuit comprises a processor configured to determine the start time as a time at which the ramp signal has a predefined amplitude.

10. The system of claim 1 wherein the timing circuit comprises a field programmable gate array configured by logic to determine the start time as a predefined amplitude point of the trigger signal.

11. The system of claim 1 wherein the summer and the trigger circuit comprise a mixed analog and digital timing pickoff circuit configured to generate the trigger signal.

12. The system of claim 1 wherein the trigger circuit comprises an analog-to-digital converter and processor based mixed timing pickoff circuit implemented per detector block to convert the trigger signal with a time-deterministic leading edge to a time-mark in digits.

13. The system of claim 1 wherein the trigger threshold is determined experimentally to find a best timing.

14. The system of claim 3 wherein the trigger threshold is determined experimentally to find a lowest jitter.

* * * * *